United States Patent
Miyajima

(10) Patent No.: US 10,459,386 B2
(45) Date of Patent: Oct. 29, 2019

(54) IMAGE FORMING APPARATUS, METHOD OF CONTROLLING THE SAME, STORAGE MEDIUM, AND IMAGE FORMING SYSTEM

(71) Applicant: CANON KABUSHIKI KAISHA, Tokyo (JP)

(72) Inventor: Jun Miyajima, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 15/807,644

(22) Filed: Nov. 9, 2017

(65) Prior Publication Data

US 2018/0136596 A1   May 17, 2018

(30) Foreign Application Priority Data

Nov. 17, 2016   (JP) ................................. 2016-224538

(51) Int. Cl.
*G03G 15/00* (2006.01)
*G06F 3/12* (2006.01)

(52) U.S. Cl.
CPC ......... *G03G 15/50* (2013.01); *G03G 15/5083* (2013.01); *G06F 3/1204* (2013.01); *G06F 3/1229* (2013.01); *G06F 3/1286* (2013.01); *G03G 15/757* (2013.01); *G03G 2215/00949* (2013.01); *G06F 2206/1506* (2013.01)

(58) Field of Classification Search
CPC .. G03G 15/50; G03G 15/5083; G03G 15/757; G03G 2215/00949; G06F 3/1204; G06F 3/1229; G06F 3/1286; G06F 2206/1506
See application file for complete search history.

(56) References Cited

U.S. PATENT DOCUMENTS 9,791,815 B2   10/2017 Hiroya
2006/0263109 A1*  11/2006 Murata ................. G03G 15/50
399/82

FOREIGN PATENT DOCUMENTS

JP   2016-020035 A   2/2016
JP   2016-022599 A   2/2016

* cited by examiner

*Primary Examiner* — Gregory H Curran
(74) *Attorney, Agent, or Firm* — Venable LLP

(57) ABSTRACT

An image forming apparatus is operable in a first mode, in which a job can be processed at a first printing speed, and a second mode, in which the job can be processed at a second printing speed faster than the first printing speed. The apparatus includes at least one processor that executes instructions to receive a reservation of a period in which the image forming apparatus will operate in the second mode, and to control the image forming apparatus to operate in the second mode, rather than the first mode, in accordance with the reservation. Further, the at least one processor executes the instructions to set a function in which the image forming apparatus operates in the second mode to be one of disabled and enabled, and to enable the reservation to be received based on the set function being changed from disabled to enabled.

17 Claims, 13 Drawing Sheets

FIG. 4A

PRODUCTIVITY-UP PERIOD SETTING

| START | | END |
|---|---|---|
| 2016/06/17 (FRI) 0:00 | TO | 2016/06/18 (SAT) 0:00 |
| 2016/06/24 (FRI) 0:00 | TO | 2016/06/25 (SAT) 0:00 |
| 2016/07/01 (FRI) 0:00 | TO | 2016/07/02 (SAT) 0:00 |

401 ADD  402 OK

FIG. 4B

PLEASE SET PRODUCTIVITY-UP PERIOD

START DATE AND TIME
    2016/06/25   0:00  — 403

END DATE AND TIME
    2016/07/01   0:00  — 404

405 CANCEL   406 OK

FIG. 4C

PRODUCTIVITY-UP PERIOD SETTING

| START | | END | |
|---|---|---|---|
| 2016/06/17 (FRI) 0:00 | TO | 2016/06/18 (SAT) 0:00 | |
| 2016/06/24 (FRI) 0:00 | TO | 2016/06/25 (SAT) 0:00 | |
| 2016/06/25 (SAT) 0:00 | TO | 2016/07/01 (FRI) 0:00 | -- 407 |
| 2016/07/01 (FRI) 0:00 | TO | 2016/07/02 (SAT) 0:00 | |

408 ADD   409 OK

IMAGE FORMING APPARATUS, METHOD OF CONTROLLING THE SAME, STORAGE MEDIUM, AND IMAGE FORMING SYSTEM

CLAIM TO PRIORITY

This application claims the benefit of Japanese Patent Application No. 2016-224538, filed on Nov. 17, 2016, which is hereby incorporated by reference herein in its entirety.

BACKGROUND OF THE INVENTION

Field of the Invention

The present invention relates to an image forming apparatus, a method of controlling the same, a storage medium, and an image forming system.

Description of the Related Art

An image forming apparatus capable of printing normal paper of an A4 size at an output speed of 40 pages per minute (PPM) at certain times, and printing normal paper of the A4 size at an output speed of 60 PPM at other times, is known. An image forming apparatus capable of printing at multiple productivity levels for the same paper size and paper type is provided with a normal productivity mode, in which print processing is performed at a normal level of productivity, and a high productivity mode, in which print processing is performed at a greater level of productivity than in the normal productivity mode. Conventionally, it was necessary for a service engineer or a maintenance person to set the productivity mode to the high productivity mode in order to switch the operation mode (the productivity mode) from the normal productivity mode to the high productivity mode.

In Japanese Patent Laid-Open No. 2016-020035, an image forming apparatus in which an operation mode (productivity mode) is switched from a normal productivity mode to a high productivity mode upon an installation of a software option is disclosed. Also, Japanese Patent Laid-Open No. 2016-022599 discloses an image forming apparatus in which an upper limit value for a cumulative number of print sheets in a high productivity mode is set upon an installation of a license by a user, and the productivity mode is switched from a normal productivity mode to the high productivity mode.

Note that there is the concept of a period license by which it is possible to operate in a high productivity mode for only a specified period. For example, a user may be allowed to operate in the high productivity mode as a test for only a specified period when considering a purchase to switch to a high-speed model, or may be allowed to operate in a high productivity mode for only the specified period in a case in which printing is concentrated in a specified time period, such as every weekend.

By the conventional productivity mode method of switching, switching of the productivity mode must be performed manually to apply a period license. For this reason, it is necessary to call the service engineer or the maintenance person and to wait until they arrive in order to switch the productivity mode from the normal productivity mode to the high productivity mode, which is inconvenient. For example, in the case in which it is desired that the image forming apparatus be allowed to operate in the high productivity mode only in the specific time period of every week on Friday from 0:00 to 23:59, it is necessary to call the service engineer or the maintenance person every week. Thus, there is a cost in terms of time and a cost in terms of manpower.

SUMMARY OF THE INVENTION

The present invention enables realization of an image forming apparatus reserving a period in which operation is possible in a high productivity mode.

According to one aspect, the present invention provides an image forming apparatus operable in a first mode, in which a job can be processed at a first printing speed, and a second mode, in which the job can be processed at a second printing speed faster than the first printing speed, the apparatus comprising a memory device that stores a set of instructions, and at least one processor that executes the instructions to receive a reservation of a period in which the image forming apparatus will operate in the second mode, and to control the image forming apparatus to operate in the second mode, rather than the first mode, in accordance with the reservation.

According to another aspect, the present invention provides an image forming system in which an image forming apparatus, which is operable in a first mode, in which a job can be processed at a first printing speed, and a second mode, in which the job can be processed at a second printing speed faster than the first printing speed, and a server can communicate, wherein the server comprises a user interface configured to receive a reservation of a period in which the image forming apparatus will operate in the second mode, and a holding unit configured to hold a reservation received by the user interface as reservation information, and the image forming apparatus comprises a memory device that stores a set of instructions, and at least one processor that executes the instructions to make a request to the server to obtain reservation information from the server, and to control the image forming apparatus to operate in the second mode, rather than the first mode, in accordance with the obtained reservation information.

According to still another aspect, the present invention provides a method of controlling an image forming apparatus, which is operable in a first mode, in which a job can be processed at a first printing speed, and a second mode, in which the job can be processed at a second printing speed faster than the first printing speed, the method comprising receiving a reservation of a period in which the image forming apparatus will operate in the second mode, and controlling the image forming apparatus to operate in the second mode, rather than the first mode, in accordance with the reservation.

According to yet another aspect, the present invention provides a non-transitory computer-readable storage medium storing a program for causing a computer to execute the steps of a method of controlling an image forming apparatus operable in a first mode, in which a job can be processed at a first printing speed, and a second mode, in which the job can be processed at a second printing speed faster than the first printing speed, the method comprising receiving a reservation of a period in which the image forming apparatus will operate in the second mode, and controlling the image forming apparatus to operate in the second mode, rather than the first mode, in accordance with the reservation.

Further features of the present invention will be apparent from the following description of exemplary embodiments with reference to the attached drawings.

BRIEF DESCRIPTION OF THE DRAWINGS

FIGS. 4A to 4C are views for describing screens displayed on a user interface (UI) apparatus 600 according to an embodiment.

DESCRIPTION OF THE PREFERRED EMBODIMENTS

Preferred embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

Configuration of Image Forming System

Figure 1:
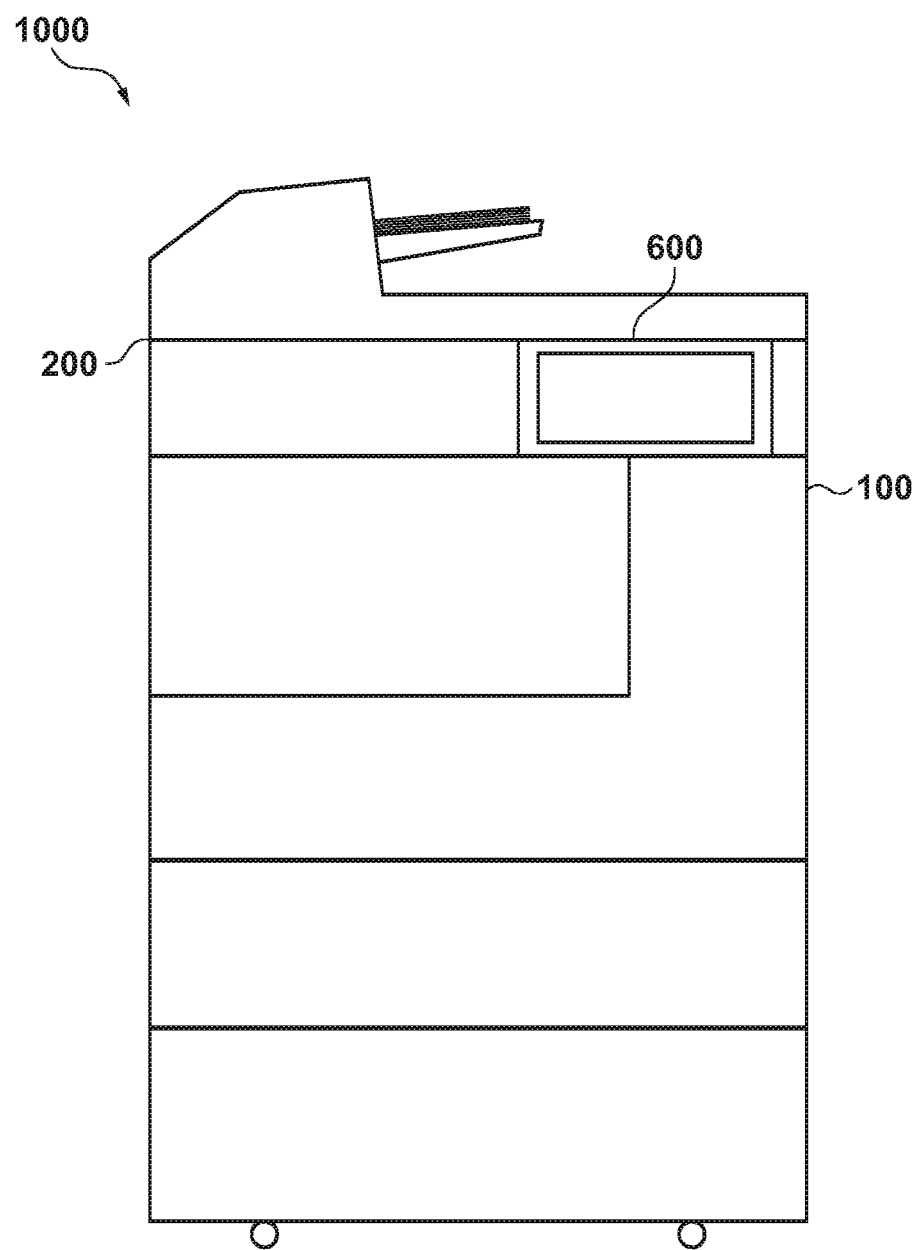
FIG. 1 is a schematic view of an image forming system according to an embodiment.

First, with reference to FIG. 1, an overall configuration of an image forming system 1000 of the present embodiment is described. The image forming system 1000 comprises an automatic original scanning apparatus 200, an image forming apparatus 100, and a user interface (UI) apparatus 600. Note that, while not illustrated in FIG. 1, a server, which is an information processing apparatus, may also be included in the image forming system 1000. In such a case, the server is connected to be able to communicate with the image forming apparatus 100 wirelessly or by a wire, and can accept a later-described operation mode period. In such a case, a reservation may be accepted when an operator makes the reservation on the server, or may be accepted from an external apparatus by communication.

The automatic original scanning apparatus 200 scans an original that is placed on a platen glass, and outputs image data. The image forming apparatus 100 forms an image on a recording material (sheet) in accordance with image data output from the automatic original scanning apparatus 200 or image data input from an external apparatus connected via a network. Also, the image forming apparatus 100 can operate in two operation modes (productivity modes): a normal productivity mode and a high productivity mode, described later. The UI apparatus 600 has a touch-panel-attached liquid crystal display, presents information to a user, and accepts input operations, such as designation of a number of print sheets in accordance with a Graphical User interface (GUI). The UI apparatus 600 may comprise hardware keys.

Configuration of Image Forming Apparatus

Figure 2:
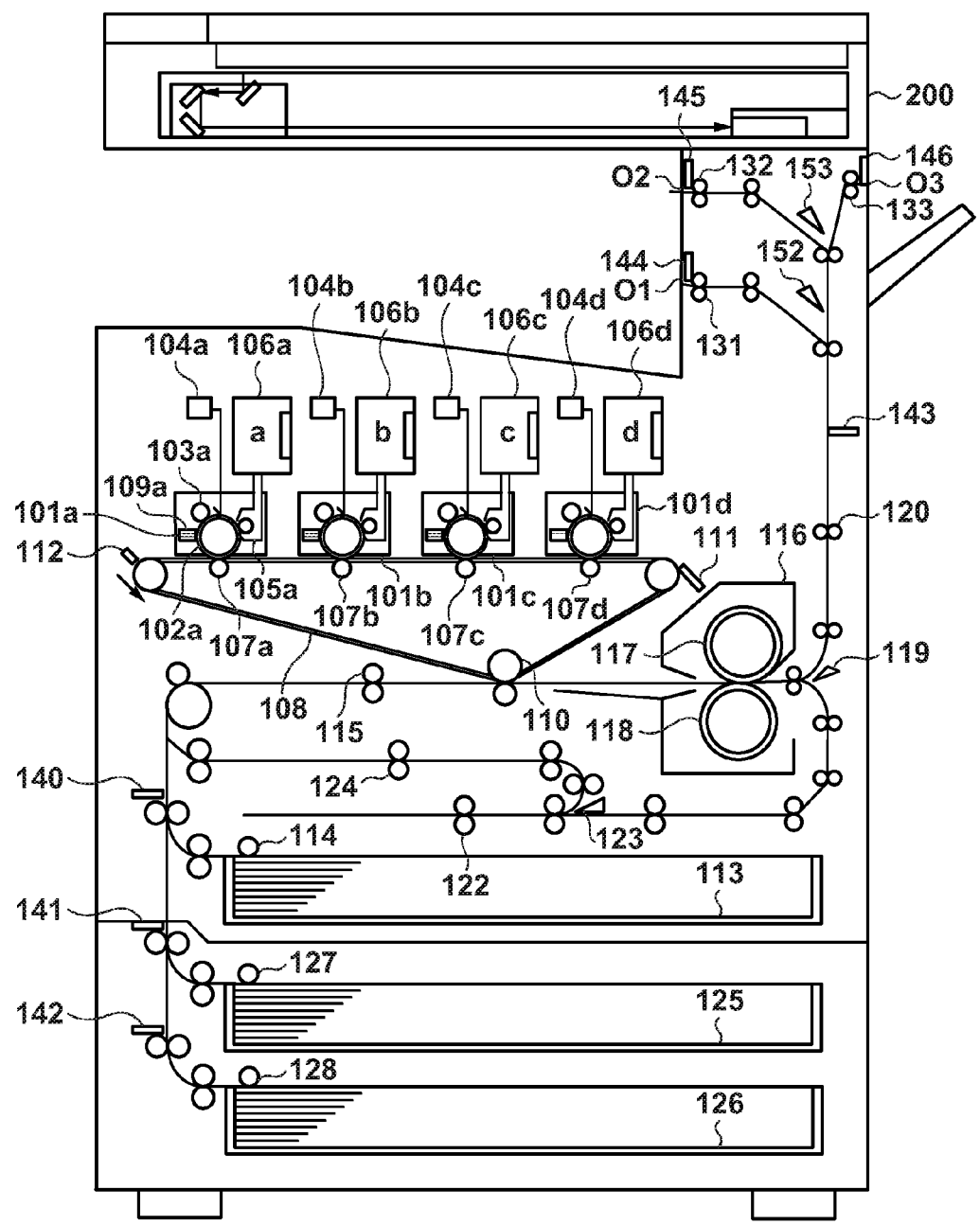
FIG. 2 is a configuration diagram of an image forming system according to an embodiment.

Next, with reference to FIG. 2, a specific configuration and image forming operation of the image forming apparatus 100 will be described. Reference numerals 101a to 101d are processing units of a plurality of colors, such as the colors black, yellow, cyan, and magenta, for example, and are configured by a photosensitive drum, a developing unit, and a charging roller. In a central portion of the processing unit 101a, a photosensitive drum 102a is held, and is rotationally driven by a drum motor (not shown). Reference numeral 103a is a charging roller, and is something that uniformly charges the surface of the photosensitive drum 102a by application of a high voltage. Reference numeral 104a is a laser scanner unit that uses a polygon mirror rotating body to cause a laser, which is modulated and output from a laser diode, to scan in a lengthwise direction of the photosensitive drum 102a. The laser scanner unit 104a conducts a laser exposure in accordance with input image information on the uniformly charged photosensitive drum 102a, and forms an electrostatic latent image. Reference numeral 105a is a developing unit, and forms a visible toner image, according to an electrostatic latent image, on a photosensitive drum 102a by a two-component developer consisting of a toner and a carrier. Reference numeral 106a is a toner bottle unit consisting of a toner bottle filled with toner and a toner conveyance mechanism, and supplies toner to the developing unit 105a. The toner is a consumable material, and the toner bottle is configured so that it can be attached/detached and exchanged. Reference numeral 107a is a primary transfer roller, and is something that primary transfers a toner image from the photosensitive drum 102a to an intermediate transfer body 108, which is an endless belt member. Reference numeral 109a is an auxiliary charging brush, and is something that charges, such that remaining toner after transfer that was not completely transferred by the primary transfer roller 107a has a uniform charge.

The description given for the photosensitive drum 102a, the charging roller 103a, the developing unit 105a, the toner bottle unit 106a, and the auxiliary charging brush 109a included in the processing unit 101a similarly applies for the processing units 101b, 101c, and 101d. Below, in cases in which a, b, c, and d are abbreviated, and simply the processing unit 101, the photosensitive drum 102, the charging roller 103, the developing unit 105, the toner bottle unit 106, and the auxiliary charging brush 109 are described, the description is common to each of the units a to d.

A toner image, after being primary transferred to the intermediate transfer body 108, is secondary transferred onto a sheet by the secondary transfer roller indicated by reference numeral 110. Remaining toner that was not completely transferred by the secondary transfer roller 110 and a toner image for adjustment, and not intended to be transferred onto a sheet, are recovered by an intermediate transfer body cleaner 111 and are stored in a remaining toner storage container (not shown). Reference numeral 112 is a pattern density detection sensor that detects a shading change of a pattern for which image formation was performed on the intermediate transfer body 108.

Sheets are housed in a feed cassette 113, and a sheet is sent to the secondary transfer roller 110 after the sheet is conveyed by a feed roller 114 and skew is corrected by a registration roller 115. For a sheet to which a toner image has been transferred by the secondary transfer roller 110, a toner image is thermally fixed by a fixing unit 116 configured from a fixing roller 117 and a pressure roller 118. After that, the sheet is sent by a discharge flapper 119 to discharge orifice O1, O2, or O3 via a discharge path 120 or a side reversal drive 122. A plurality of sheet detection sensors 140, 141, 142, 143, 144, 145, and 146 are provided on the sheet conveying paths, and are used to control sheet conveyance and to detect a jammed state.

A sheet that is sent to the side reversal drive 122 is sent to a double-sided re-feed drive 124 by reverse rotation of the side reversal drive 122 and rotation of a side reversal flapper 123 is once again sent to the secondary transfer roller 110, and is discharged from discharge orifice O1, O2, or O3 after an image is formed on the second side. Near the discharge orifices O1, O2, and O3, discharge rollers 131, 132, and 133 are provided, and the sheet is fed thereto so as to be discharged to the outside of the apparatus. Sheets are held in a second extension feed cassette 125 and a third extension feed cassette 126, and it is possible to feed sheets from an extension cassette feed roller 127 and an extension cassette feed roller 128, as well.

Block Diagram Description

Figure 3:
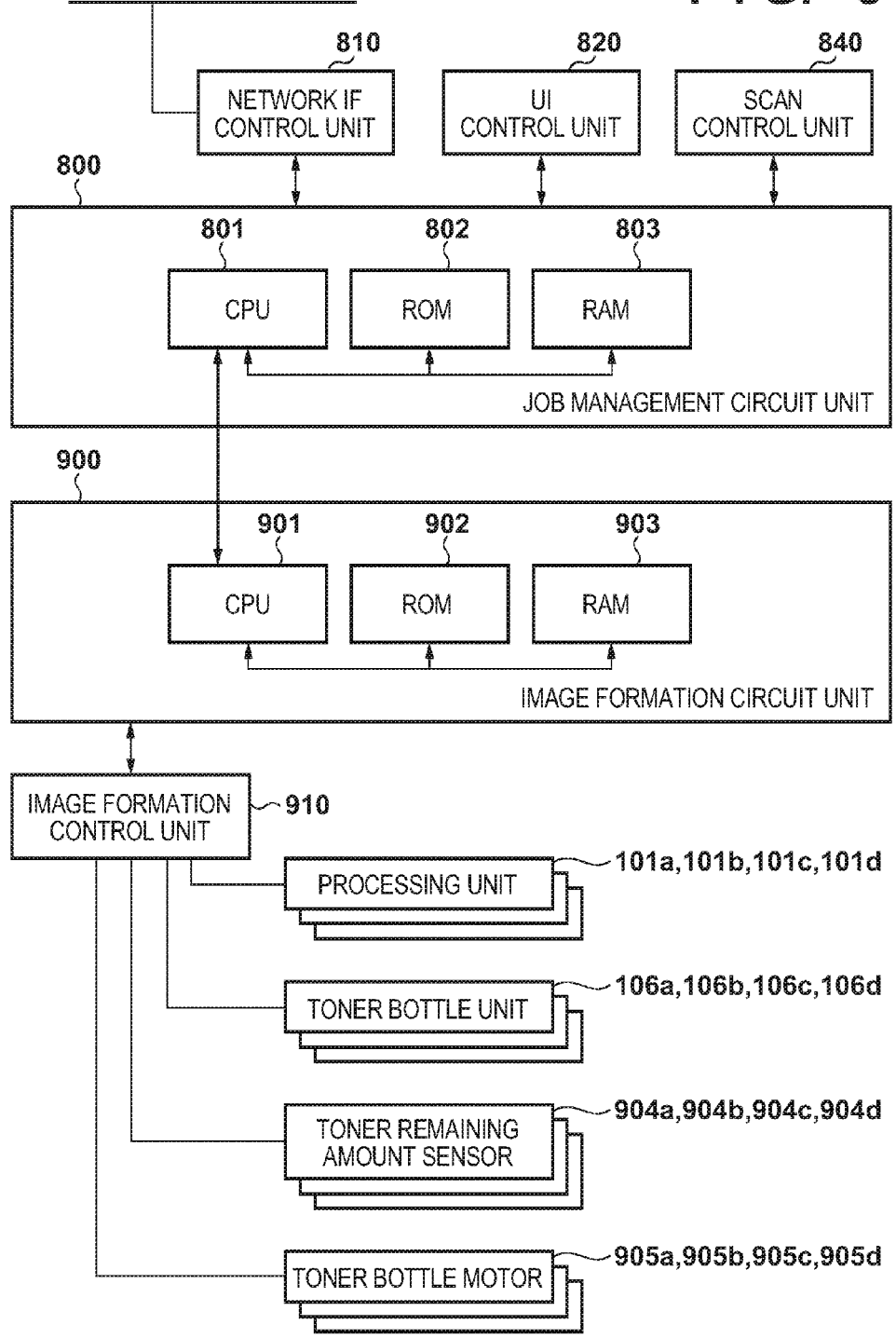
FIG. 3 is a block diagram of an image forming system according to an embodiment.

Next, with reference to FIG. 3, a control circuit configuration of the image forming system 1000 is described. The image forming system 1000 comprises, as control configurations, a job management circuit unit 800, an image formation circuit unit 900, an image formation control unit 910, a network interface (I/F) control unit 810, a UI control unit 820, and a scan control unit 840.

The job management circuit unit 800 comprises a central processing unit (CPU) 801, a read only memory (ROM) 802, and a random access memory (RAM) 803. The job management circuit unit 800 is a first controller. The CPU 801 controls the network I/F control unit 810, the UI control unit 820, and the scan control unit 840 of the image forming system 1000. The ROM 802 stores programs for the CPU 801 to operate. The RAM 803 has a backup memory function, and is used to temporarily store data for a result that the CPU calculated.

The image formation circuit unit 900 comprises a CPU 901, a ROM 902, and a RAM 903. The image formation circuit unit 900 is a second controller. Along with performing exchange with the CPU 801 of jobs, image data, and information related to consumables, such as toner, the CPU 901 controls the image formation control unit 910. The ROM 902 stores programs for the CPU 901 to operate. The RAM 903 has a backup memory function, and is used to temporarily store data for a result that the CPU calculated.

The network I/F control unit 810 is connected with an external network, and performs communication of information related to management of external apparatuses, job data, and consumables, such as toner. The UI control unit 820 controls the UI apparatus 600, and exchanges signals corresponding to job operation with the CPU 801. The scan control unit 840 controls the automatic original scanning apparatus 200 to scan an original and to pass image data to the CPU 801.

The image formation control unit 910 drives a drum motor (not shown) by a control signal from the CPU 901. Also, the image formation control unit 910 controls units related to image formation, such as processing units 101a to 101d, toner bottle units 106a to 106d, toner remaining amount sensors 904a to 904d, and toner bottle rotation motors 905a to 905d. Here, the toner bottle unit 106 is configured to supply toner to a corresponding processing unit 101 by driving the toner bottle rotation motor 905. Also, it is possible to determine whether or not toner remains in a bottle by detecting toner supplied from a bottle by the toner remaining amount sensors 904a to 904d provided on a supply path. Also, the image formation control unit 910 controls units related to sheet conveyance, such as the feed cassettes 113, 125, and 126 for which the feed rollers 114, 127, and 128 are driven by a feed-conveyance motor (not shown). Also, the image formation control unit 910 controls units related to fixation operations, such as driving the fixing roller 117 and the pressure roller 118 by a fixing motor (not shown), and also heating the fixing roller 117 and the pressure roller 118 by a fixing heater (not shown). The image formation control unit 910 and each unit controlled by the image formation control unit 910 are collectively referred to as a printer engine.

Productivity Mode Switching Function

Next, with reference to FIGS. 4A to 4C, a function for switching the productivity mode will be described. According to the present embodiment, in the image forming system 1000, as productivity modes, there is the normal productivity mode (first mode) and the high productivity mode (second mode), in which printing is performed at a greater productivity than in the normal productivity mode. Specifically, in the high productivity mode, for example, image formation (printing) is performed at a productivity that is approximately 1.5 times that of the normal productivity mode. For example, in the normal productivity mode, 40 sheets of normal paper of the A4 size can be printed per minute (i.e., a 40 PPM output speed). For example, in the high productivity mode, 60 sheets of normal paper of the A4 size can be printed per minute (i.e., a 60 PPM output speed). The normal productivity mode and the high productivity mode, respectively, are a mode in which printing of a job is performed at a first output speed and a mode in which printing is performed at a second output speed that is greater than the first output speed. Also, in the high productivity mode, the image formation process speed itself may be executed at a high speed, or the high productivity may be realized by shortening an interval at which sheets (recording media) to which images are printed are fed, i.e., the sheet interval (the interval between two consecutive sheets). Also, as a feature of the image forming system 1000 of the present embodiment, the image forming system 1000 does not require a restart when a productivity mode switch is performed. For this reason, it is possible to switch the productivity mode while an input job is being processed. Also, the image forming system 1000 can process a job input prior to switching the productivity mode after switching the productivity mode. An image forming system for which a restart is necessary in order to switch the productivity mode is, however, also possible. For example, a configuration may be such that, if the timing for switching the productivity mode came during processing of a job, a restart is performed after the part of the job that is yet to be processed and subsequent jobs are saved to a non-volatile memory, and the saved part of the job that is yet to be processed and the subsequent jobs are executed in the productivity mode after the switch. Alternatively, a configuration may be such that a restart is performed after completion of the processing for a job for which the productivity mode is determined by the later-described method in the determined productivity mode, and then, the productivity mode is switched. Note that in the image forming apparatus 100 of the present embodiment, such a productivity mode switching function first becomes enabled upon input into the image forming apparatus 100 of a predetermined license key or upon resetting of the image forming apparatus 100 by a service person. When this productivity mode switching function is changed from disabled to enabled, it is necessary to restart the image forming apparatus 100. If the productivity mode switching function is enabled for the image forming apparatus 100, as will be later described, it is possible to reserve a high productivity mode period, and the image forming apparatus 100 will operate in the high productivity mode in accordance with this reservation.

FIGS. 4A to 4C are examples of setting screens that are displayed on the UI apparatus 600. When the UI apparatus 600 accepts a predetermined operation by a maintenance person or an administrator of the image forming system 1000 (both are hereafter referred to as the operator), the details of the operation are notified to the CPU 801 by the UI control unit 820, and these setting screens are displayed. Note that here, an example in which the setting screens are displayed on the UI apparatus 600, and a reservation of a high productivity mode period is accepted from the operator is described. The present invention is not, however, limited to this example, and various changes are possible. For example, a configuration may be taken so as to display a setting screen, described later, on a server (not shown) connected via a network to the image forming apparatus 100. In such a case, the server holds high productivity mode reservation information accepted from the operator, and transmits the reservation information that it is holding in response to a request from the image forming apparatus 100. The image forming apparatus 100 determines the productivity mode using the reservation information obtained from the server.

The setting screen illustrated in FIG. 4A is a screen that indicates setting statuses (reservation conditions) for periods in which the image forming system 1000 will operate in the high productivity mode, and shows a date and time (start date and time) at which the high productivity mode will be switched into, and a date and time (end date and time) at which the normal productivity mode will be returned to. In other words, a period between the start date and time and the end date and time is a period (a "productivity-up period") that is reserved in advance and in which image formation in the high productivity mode is possible. This productivity-up period setting information (reservation information) is held by the RAM 803. To close this screen, the operator presses an OK button 402. This reservation condition screen can display a plurality of periods in a list, and the plurality of periods are arranged so that the start dates and times of the respective plurality of periods are in increasing order from the top to the bottom of this list.

Here, a case in which the operator newly sets (reserves) "the period from 25 Jun. 2016 00:00 to 2 Jul. 2016 00:00" as the productivity-up period is described. The operator presses an add button 401 in the screen illustrated in FIG. 4A. Then, the screen transitions to the setting screen illustrated in FIG. 4B. The operator presses the start date and time setting field 403 on this screen and designates a start date and time using a software keyboard (not shown) or a numeric keypad (not shown). Similarly, in a case in which an end date and time are designated, the operator designates the date and time by pressing a setting field 404. The operator may press a cancel button 405 to cancel the reservation according to the setting. In such a case, the screen returns to FIG. 4A. Meanwhile, if satisfied with the setting, the operator completes the new productivity-up period reservation by pressing an OK button 406. In other words, the UI apparatus 600 can accept a productivity-up period reservation from the operator. The accepted reservation information is notified to the CPU 801 via the UI control unit 820 and stored in the RAM 803. Specifically, the CPU 801 accepts the productivity-up period reservation inputted by the operator. Then, the screen transitions to FIG. 4C. FIG. 4C is a screen that is similar to FIG. 4A, but to which the newly reserved period 407 is added. In FIG. 4C, the screen settings are such that the operator predicts that a large amount of printing will be performed on Friday of every week and from the 25th to the end of each month, and the high productivity mode is set in accordance with the user input. Note that when it is desired that a previously set reservation (for example, the reservation period 407) be canceled, the operator can cause the screen of FIG. 4B to be displayed on the UI control unit 820 by pressing that period (the reservation period 407), and then pressing the cancel button 405 on that screen.

As described above, image formation is performed at a productivity based on setting information stored in the RAM 803. Specifically, in accordance with reservations accepted from the operator, the first controller 800 controls whether to perform print output for a job in the normal productivity mode (at a first output speed) or in the high-speed productivity mode (at a second output speed). An output speed instruction from the first controller 800 to the second controller 900 is included in this control. The second controller 900 controls the printer engine in accordance with that instruction. In this way, the output speed of the image forming apparatus is controlled by cooperation of the first controller, the second controller, and the printer engine. Below, in each embodiment, a situation in which print output for a job is executed in a productivity mode according to the reservation information will be described.

First Embodiment

Below, using FIG. 5 through FIG. 7, the image forming system according to a first embodiment of the present invention will be described. In the present embodiment, it is determined whether to execute a job in the high productivity mode or the normal productivity mode based on either the print start time or the time at which the print job was input. The image forming system of the present embodiment is controlled such that the print output of the job is processed in the high productivity mode either under the condition that the job was input in a reserved period or under the condition that the job is started in a reserved period. Also, if the condition is not satisfied, the job is processed in the normal productivity mode. More specifically, one of the features of the present embodiment is to reference either the time at which the job was input or the time at which processing of the job is started and the productivity-up periods to determine the productivity mode in which to process the job. Inputting of a job means that the CPU 801 accepts an instruction to execute that job, for example, but limitation is not made to this configuration. The start of the job processing means that the image data of the first page associated with the job is in a state in which it can be transmitted from the CPU 801 to the CPU 901, and the state is such that it is possible to start printing to the first page. Starting to generate the first page of image data associated with the job by rendering processing may, however, be treated as the start of job processing. Also, in the present embodiment, one feature is that, even if the processing of a job is started in a determined productivity mode, and during processing of that job, a productivity-up period either starts or ends, the processing of that job is continued in the determined productivity mode without interrupting the processing of that job.

Setting Screen

Figure 5:
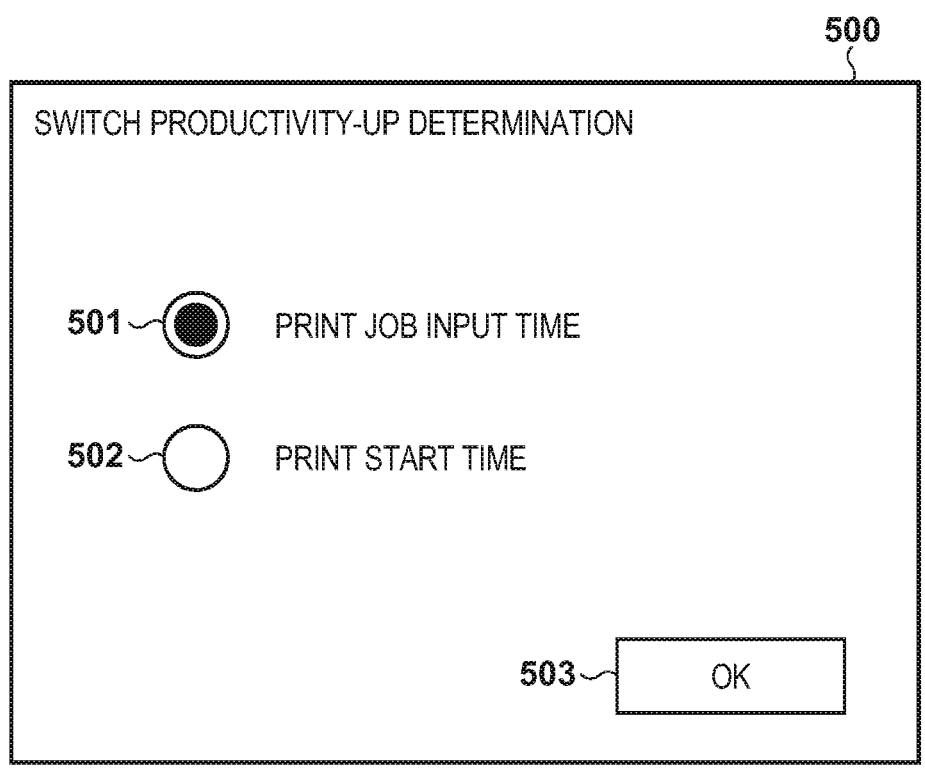
FIG. 5 is a view for describing a screen displayed on the UI apparatus 600 according to an embodiment.

First, FIG. 5 represents a setting screen 500 that is for setting a productivity-up determination condition and that is displayed on the UI apparatus 600. The setting screen 500 is a setting screen for allowing (accepting a user input) a maintenance person to select whether to determine the productivity mode for when printing is started based on either "PRINT JOB INPUT TIME" or "PRINT START TIME". The configuration is such that it is only possible to set one of the "PRINT JOB INPUT TIME" and "PRINT START TIME" settings by selecting radio button 501 or 502, respectively. The setting is stored in the RAM 803 via the UI control unit 820 when confirmed by pressing an OK button 503. In the setting screen 500 of FIG. 5, a state in which "PRINT JOB INPUT TIME" has been set is represented.

The "PRINT JOB INPUT TIME" setting is a setting for determining whether or not to switch the productivity mode by using the time that a print job is input. Meanwhile, with the "PRINT START TIME" setting, the determination uses the time at which the printing of the input print job is actually started. For example, if a plurality of print jobs are already on standby at the time of input, it is possible that the print start time will be significantly delayed from the print job input time. Accordingly, in the present embodiment, the user is allowed to make the setting for determining whether or not to switch the productivity mode by the print job input time or by the print start time.

Processing Procedure

Figure 6:
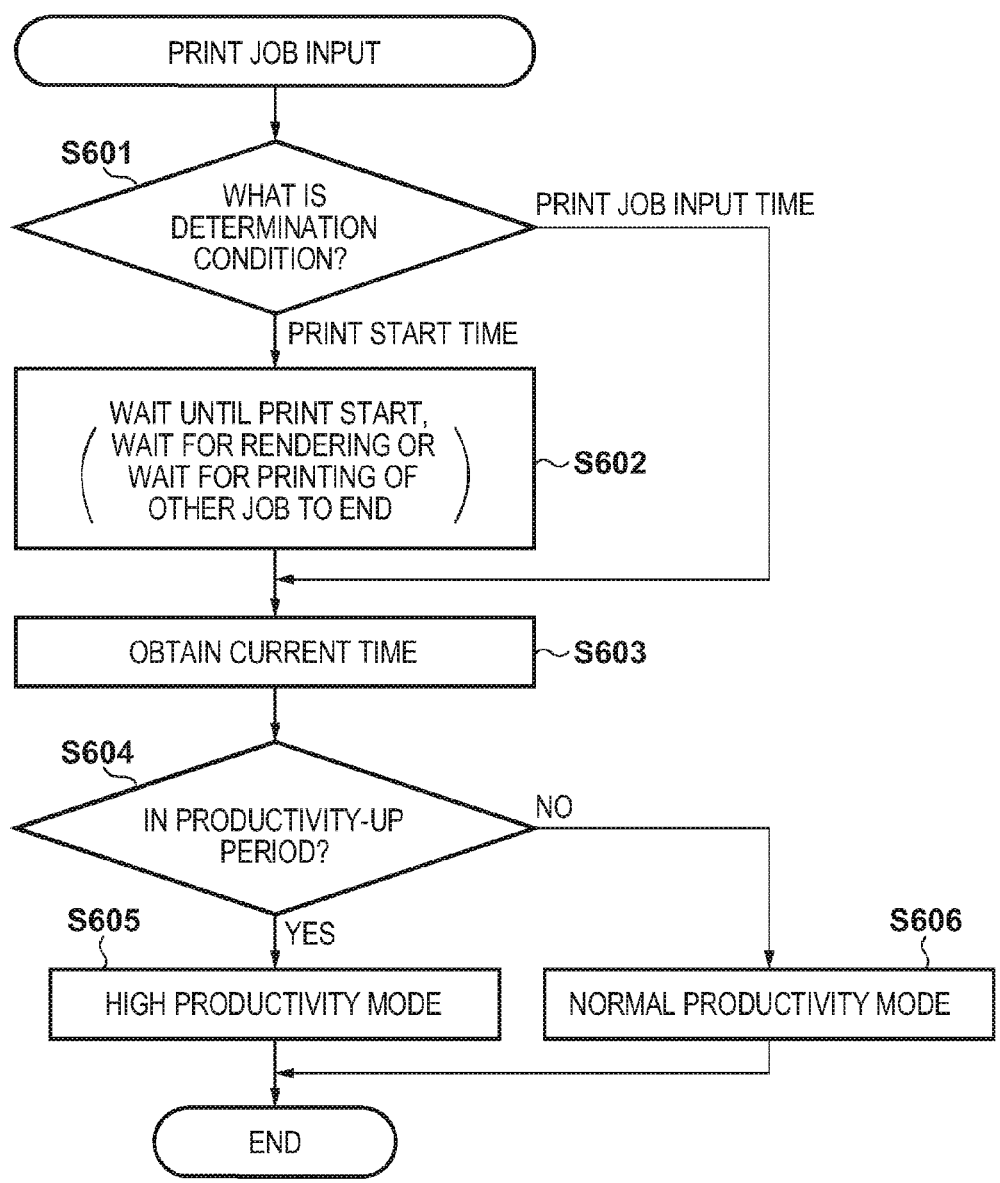
FIG. 6 is a flowchart for illustrating a determination by a central processing unit (CPU) 801 as to whether or not to print in a high productivity mode according to an embodiment.
Figure 7:
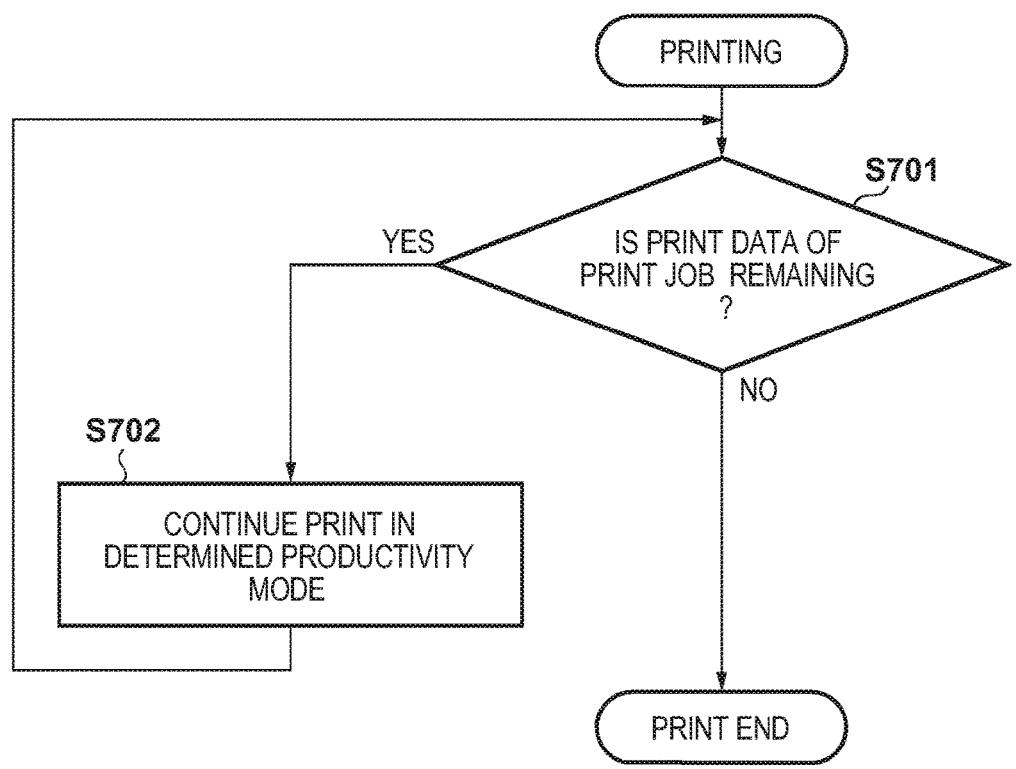
FIG. 7 is a flowchart for illustrating a control procedure by the CPU 801 for when a productivity mode switching period is spanned according to an embodiment.

Next, with reference to FIG. 6, a processing procedure for determining whether or not to print in the high productivity mode is described. The processing described below is realized by the CPU 801 reading a program stored in the ROM 802 into the RAM 803 and executing the program, for example. This flowchart is started when image data is input into the automatic original scanning apparatus 200 directly or into the automatic original scanning apparatus 200 from an external apparatus connected via a network is accepted by the CPU 801.

First, in step S601, the CPU 801 confirms whether to determine the productivity mode when starting printing by "the print job input time" or "the print start time" in accordance with information set via the setting screen 500. If the print start time is selected, the CPU 801 advances to step S602, and, if the print job input time is selected, the CPU 801 advances to step S603.

In step S602, the CPU 801 waits until a state in which the image data can be printed since print start time has been selected in step S601. For example, if another job is already printing, printing for the job will not be started until the other job ends. Also, in the case of image data defined in Page Description Language, it is necessary to execute rendering processing, and so it will not be possible to print until that image processing ends. After the waiting in step S602 completes, the CPU 801 advances to step S603.

In step S603, the CPU 801 obtains the current time by a real-time clock (RTC) (not shown) in the job management circuit unit 800, the CPU 801 advances to step S604. In step S604, the CPU 801 compares the current time obtained in step S603 and the start date and time and end date and time setting information for switching to the high productivity mode stored in the RAM 803 as described in FIG. 4, and determines whether or not it is a productivity-up period. If it is a productivity-up period, the CPU 801 operates in the high productivity mode and, if not a productivity-up period, the CPU 801 operates in the normal productivity mode, and a print instruction is issued to the CPU 901 of the image formation circuit unit 900. In other words, here, the first controller (the CPU 801) determines whether to execute a target job (the current job) in the high productivity mode or in the normal productivity mode.

By this process, flexible operation in which, even if there is a time difference between the job input time and the actual print start time, a user or a maintenance person can input a setting, becomes possible. For example, if "job input time" is selected and a job is input during a productivity-up period, the job will be processed in the high productivity mode even if the actual printing is started after the productivity-up period ends. Also, if "print start time" is selected, even if a job is input immediately prior to the start of a productivity-up period, the job will operate in the high productivity mode if the actual printing is started after the productivity-up period starts.

Next, with reference to FIG. 7, a processing procedure of the CPU 801 during printing according to the present embodiment will be described. The processing described below is realized by the CPU 801 reading a program stored in the ROM 802 into the RAM 803 and executing the program, for example. This flowchart is started in units of pages for which image formation is performed in each job.

In step S701, the CPU 801 determines whether or not print data remains. If no print data remains, printing is ended, and, if print data remains, the CPU 801 advances to step S702. In step S702, the CPU 801 continues printing in the productivity mode determined in the above described step S604 through step S606. In other words, the first controller (the CPU 801) does not modify the productivity mode determined in step S603 even if the start date and time or the end date and time of a productivity-up period that is set in advance comes while a target job is being executed.

As described above, the image forming apparatus according to the present embodiment can operate in a normal productivity mode and in a high productivity mode of a greater productivity than the normal productivity mode. Also, the image forming apparatus, in accordance with user input, sets whether to determine the productivity mode of a job using a job input time or a job start time. Also, the image forming apparatus, in accordance with setting information that has been set, controls the job productivity mode in accordance with whether the aforementioned input time or start time is included in a period set in advance. In such a configuration, by virtue of the present embodiment, a high productivity mode or a normal productivity mode is determined by the time that the job is started or the print is started, and the mode is continued during printing. By this arrangement, in accordance with the user needs, it is possible to suitably control the productivity of jobs that have already been input, for timing for switching the productivity that is set in advance. Also, it is possible to suppress tint fluctuation and degradation of performance due to a change in productivity in accordance with the will of a user.

Second Embodiment

Figure 8:
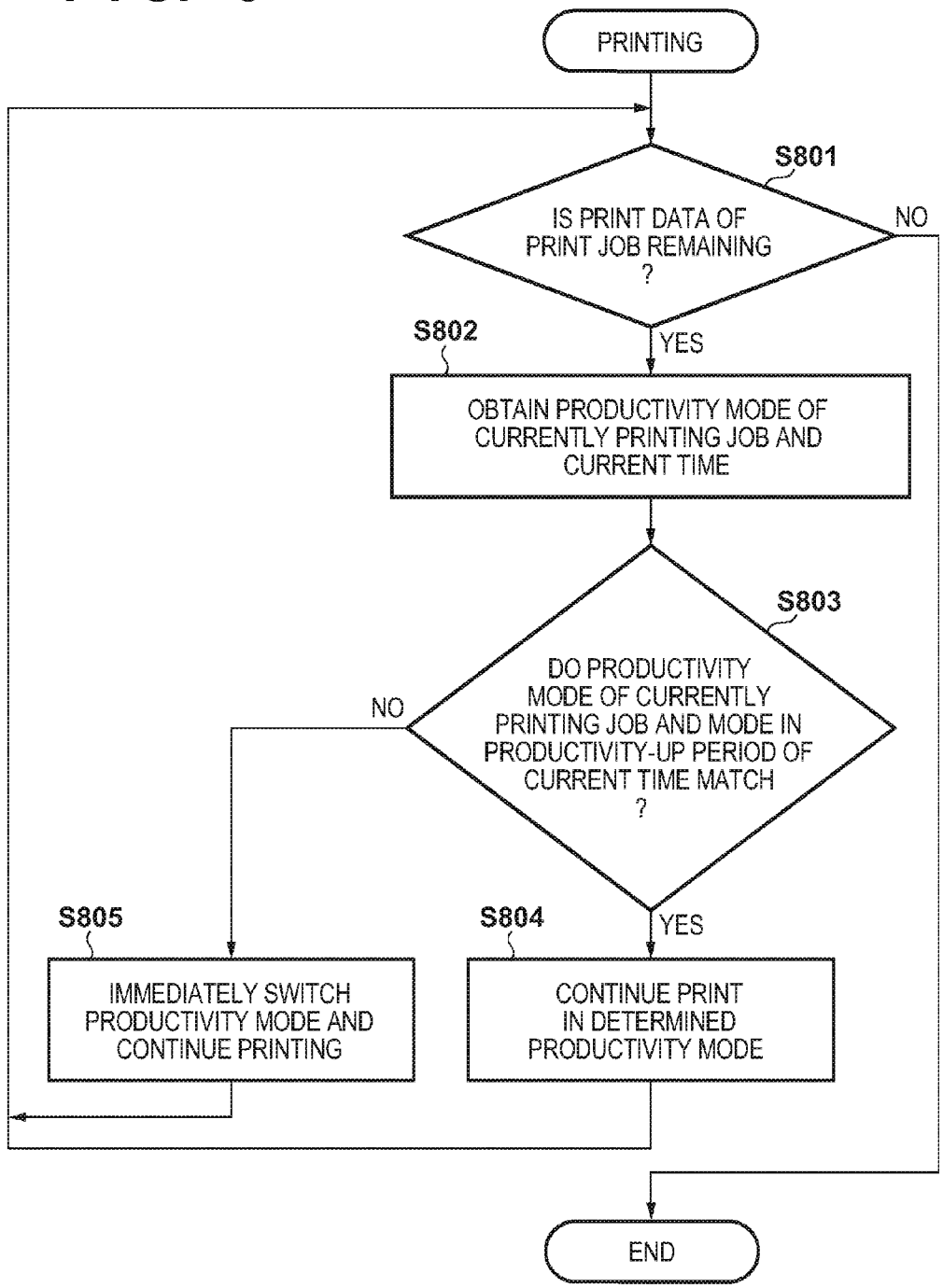
FIG. 8 is a flowchart for illustrating a control procedure by the CPU 801 for when a productivity mode switching period is spanned according to an embodiment.

Below, using FIG. 8, the image forming system according to a second embodiment of the present invention will be described. In the present embodiment, a configuration in which, during printing, the productivity mode is switched based on whether a productivity mode being applied to a job that is currently being processed (i.e., a current printing job) matches a productivity mode that has been set and that corresponds to the current time, is described. Note that in the present embodiment, a description is given only for configurations and control that differs from the above-described first embodiment. Specifically, similarly to in the first embodiment, one of the features of the present embodiment is to reference either the time at which the job was input or the time at which processing of the job is to be started, as well as the productivity-up periods to determine the productivity mode in which to process the job. Also, in the present embodiment, processing of a job is started in the determined productivity mode. In the present embodiment, one feature is that when it is detected that a productivity-up period is started or ended during processing of the job, processing of the job is continued in the productivity mode corresponding to the start or end of the productivity-up period without interrupting the processing of the job.

Processing Procedure

Next, with reference to FIG. 8, a processing procedure of the CPU 801 during printing according to the present embodiment will be described. The processing described below is realized by the CPU 801 reading a program stored in the ROM 802 into the RAM 803 and executing the program, for example. This flowchart is started in units of pages for which image formation is performed in each job.

In step S801, the CPU 801 determines whether or not print data remains. If no print data remains, printing is ended, and if print data remains, the CPU 801 advances to step S802. In step S802, the CPU 801 obtains the productivity mode (the high productivity mode or the normal productivity mode) of the current printing job and the current time, and the CPU 801 advances to step S803.

In step S803, the CPU 801 determines whether the productivity mode of the current printing job and the mode in the productivity-up period of the current time match. If they match, the CPU 801 advances to step S804, and, if they do not match, the CPU 801 advances to step S805. In step S804, the CPU 801 continues printing in the productivity mode determined in the above described step S604 through step S606, and the process returns to step S801.

Meanwhile, in step S805, since the CPU 801 determined that the productivity-up period switched in step S803, it immediately switches the productivity mode, and continues printing in accordance with the mode in a productivity-up period of the current time, and the process returns to step S801.

As described above, by virtue of the present embodiment, if processing of an accepted job spans a productivity-up mode switching period, a productivity mode determined in accordance with whether the input time or the start time are included in the productivity-up period at the spanned timing is switched. In this way, in the present embodiment, if there is a productivity-up period switch during printing, it is possible to immediately switch to that mode. Note that the following configuration is also possible. When the start or end of a productivity-up period is detected, the CPU 801 switches the productivity mode of the job being currently processed to the productivity mode corresponding to the start or end of the productivity-up period.

Third Embodiment

Below, using FIG. 9 and FIG. 10, the image forming system according to a third embodiment of the present invention will be described. In the present embodiment, a configuration in which, when the start time of a productivity-up period is reached, an inquiry is made to the user as to whether or not to switch the productivity mode, and control is performed in accordance with the response to the inquiry, is described. Note that in the present embodiment, a description is given only for configurations and control that differs from the above-described first embodiment.

Inquiry Screen

Figure 9:
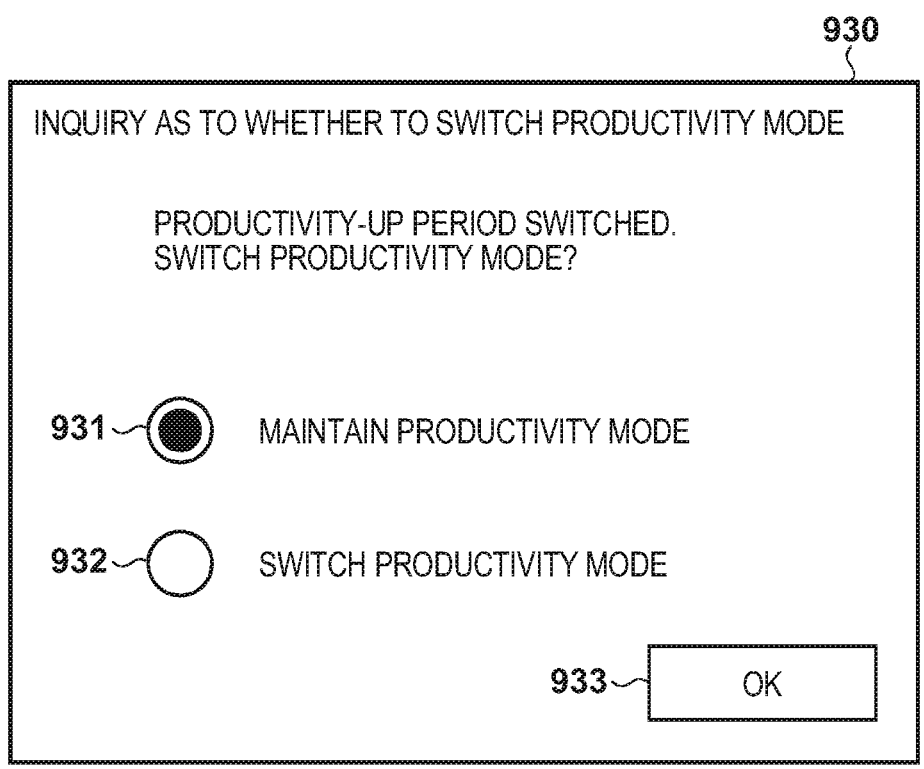
FIG. 9 is a view for describing a screen displayed on the UI apparatus 600 according to an embodiment.
Figure 10:
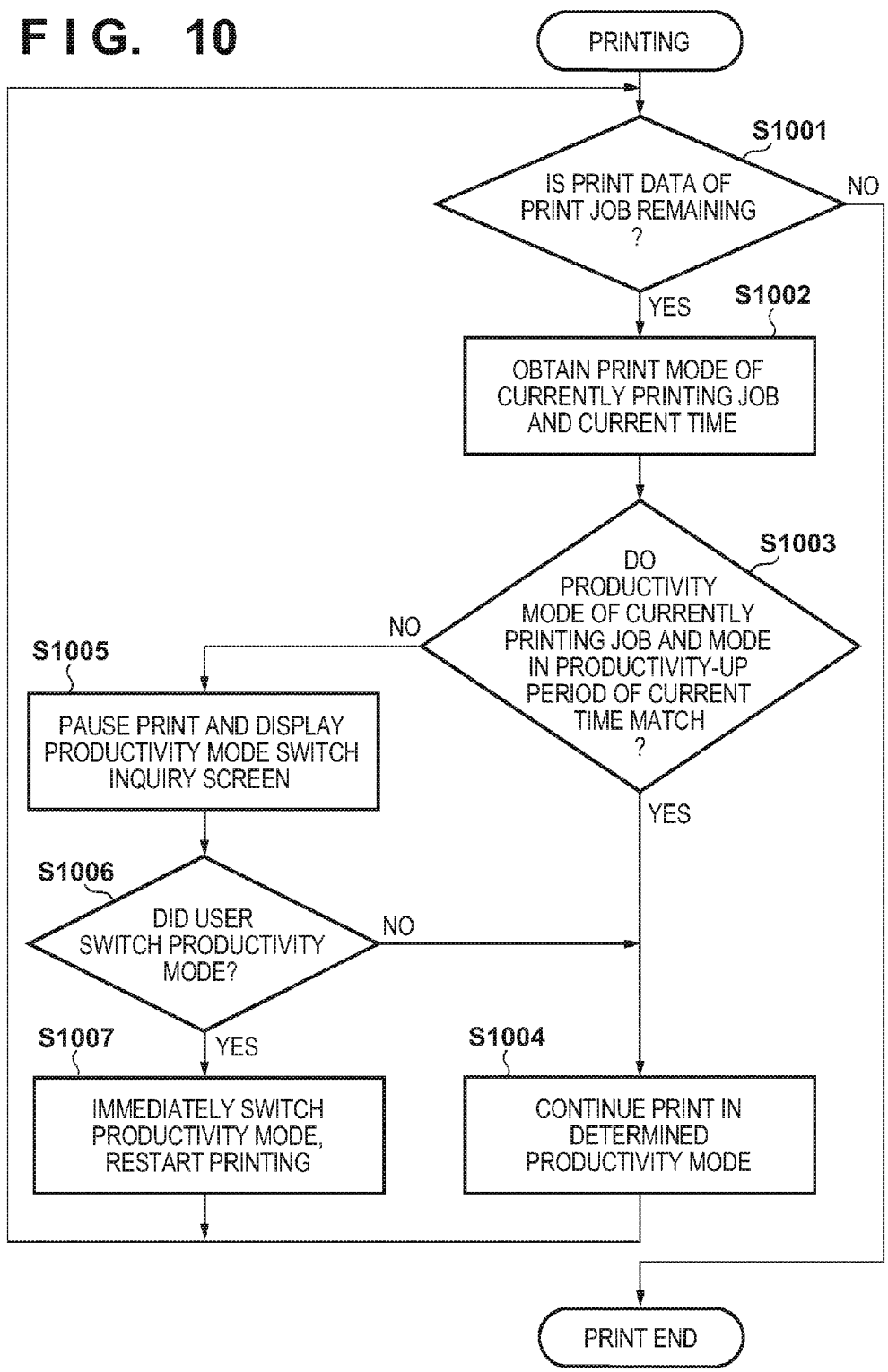
FIG. 10 is a flowchart for illustrating a control procedure by the CPU 801 for when a productivity mode switching period is spanned according to an embodiment.

With reference to FIG. 9, an inquiry screen for switching the productivity mode that is displayed on the UI apparatus 600 is described. When there is a productivity-up period switch during printing, the print is interrupted, and an inquiry screen 930 for inquiring to the user as to whether to switch the productivity mode is displayed. The user can select whether to switch the productivity mode and then restart the printing, or to continue in the current productivity mode.

The inquiry screen 930 is controlled such that only one of the radio buttons 931 and 932 can be selected for setting of "MAINTAIN PRODUCTIVITY MODE" or "SWITCH PRODUCTIVITY MODE". By pressing an OK button 933, the confirmed setting is stored in the RAM 803 via the UI control unit 820 and the CPU 801 restarts printing in accordance with this setting.

Processing Procedure

Next, with reference to FIG. 10, a processing procedure of the CPU 801 during printing according to the present embodiment will be described. The processing described below is realized by the CPU 801 reading a program stored in the ROM 802 into the RAM 803 and executing the program, for example. This flowchart is started in units of pages for which image formation is performed in each job.

In step S1001, the CPU 801 determines whether or not print data remains. If no print data remains, printing is ended, and, if print data remains, the CPU 801 advances to step S1002. In step S1002, the CPU 801 obtains the productivity mode (the high productivity mode or the normal productivity mode) of the current printing job and the current time, and the CPU 801 advances to step S1003.

In step S1003, the CPU 801 determines whether the productivity mode of the current printing job and the mode in the productivity-up period of the current time match. If they match, the CPU 801 advances to step S1004, and, if they do not match, the CPU 801 advances to step S1005. In step S1004, the CPU 801 continues printing in the productivity mode determined in the above described step S604 through step S606, and the process returns to step S1001.

In step S1005, the CPU 801 pauses printing, displays the inquiry screen 930 described in FIG. 9 on the UI apparatus 600, and waits for an instruction by the user.

In step S1006, the CPU 801 determines which of "MAINTAIN PRODUCTIVITY MODE" and "SWITCH PRODUCTIVITY MODE" was selected on the inquiry screen 930. If "MAINTAIN PRODUCTIVITY MODE" is selected, the CPU 801 advances to step S1004, and printing is continued in the productivity mode determined in the above-described step S604 through step S606. If "SWITCH PRODUCTIVITY MODE" is selected, the CPU 801 advances to step S1007.

In step S1007, since there is a productivity-up period switch in step S1006, the CPU 801 immediately switches the productivity mode, restarts printing, and returns to step S1001.

As described above, in the present embodiment, if processing of an accepted job spans a productivity-up mode switching period, an inquiry is made to a user as to whether to switch the productivity mode determined in accordance with whether the input time or the start time are included in the productivity-up period at the timing of the spanning. Also, the productivity mode is controlled in accordance with the result of this inquiry. In this way, in the present embodiment, it is possible to make an inquiry to a user as to whether to switch the productivity mode in a case in which there is a productivity-up period switch during printing, and to switch the productivity mode in accordance with the instruction of the user.

Fourth Embodiment

Below, using FIG. 11 and FIG. 12, the image forming system according to a fourth embodiment of the present invention will be described. In the present embodiment, a description is provided of a configuration in which, when a productivity mode switches, the current productivity mode is continued until a predetermined time elapses or until a predetermined number of sheets are printed, in accordance with a setting of a user. Note that in the present embodiment, a description is given only for configurations and control that differs from the above-described first embodiment.

Setting Screen

Figure 11:
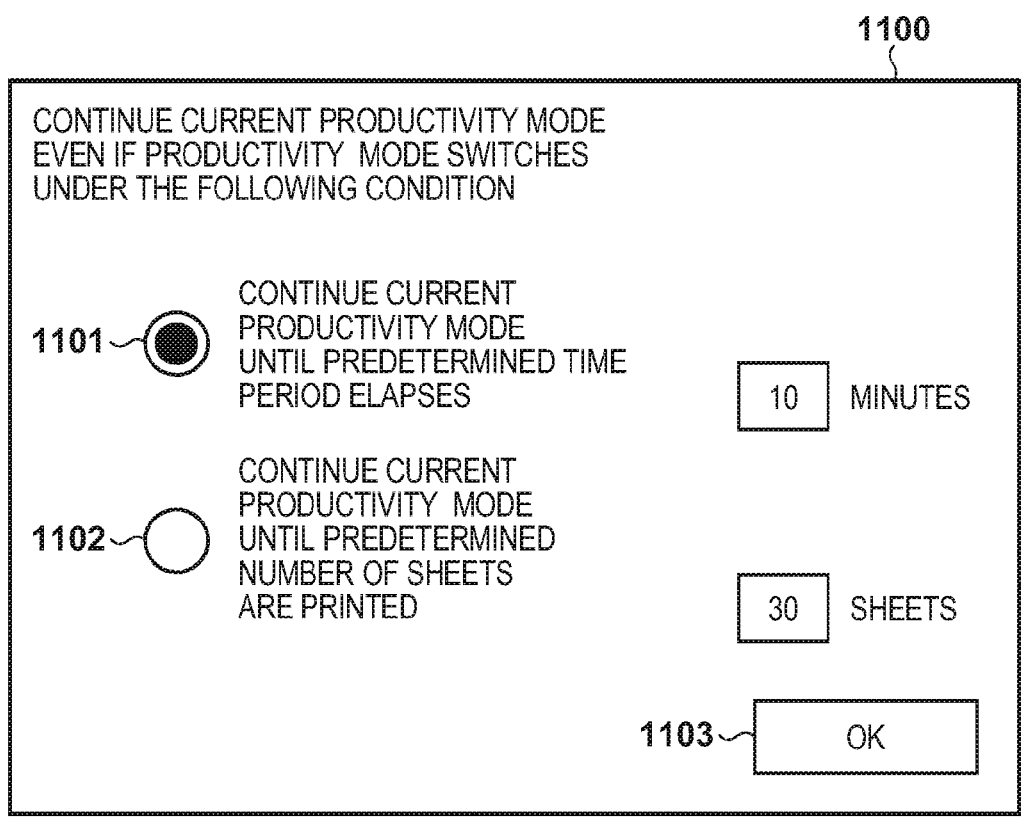
FIG. 11 is a view for describing a screen displayed on the UI apparatus 600 according to an embodiment.
Figure 12:
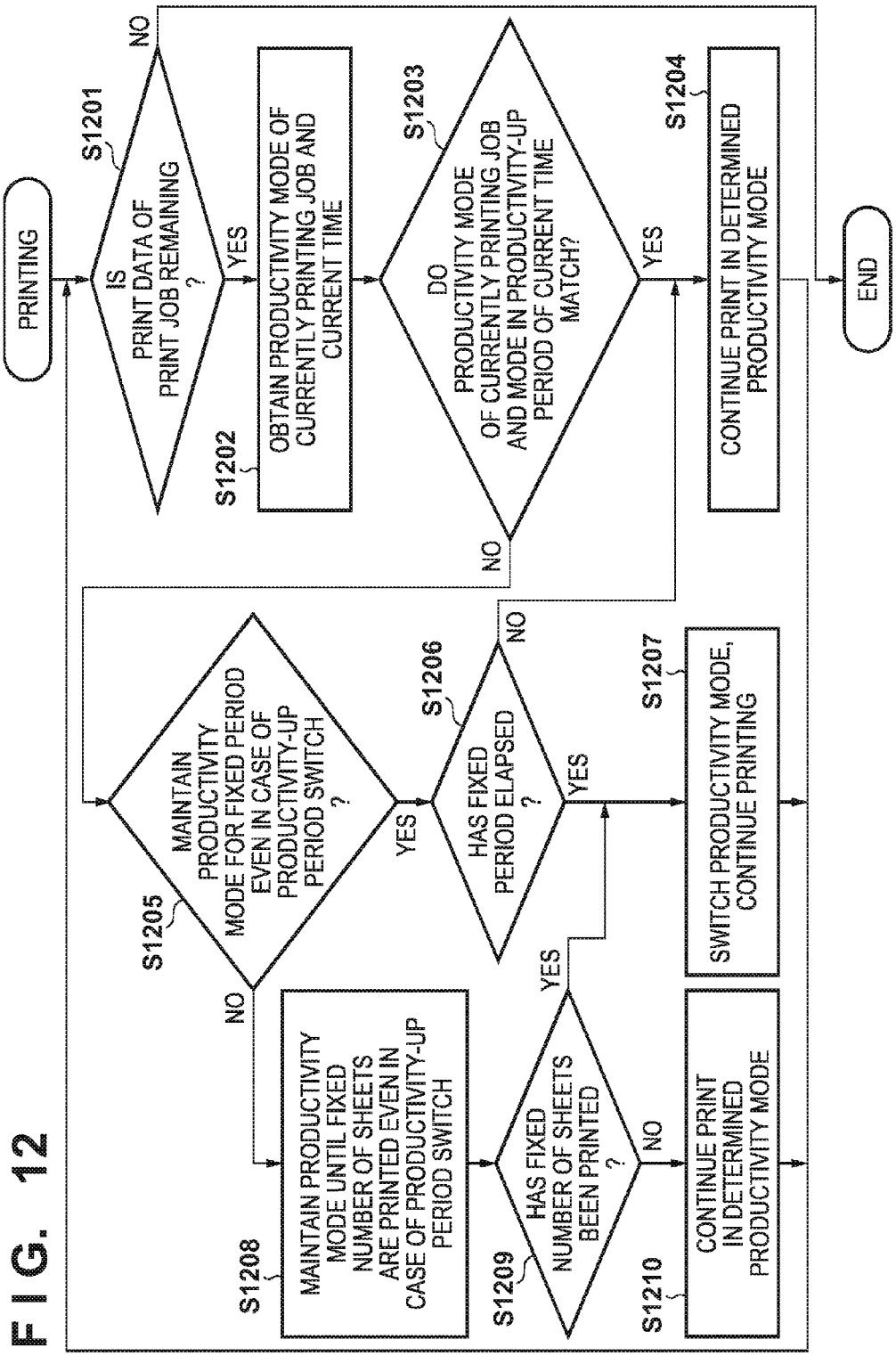
FIG. 12 is a flowchart for illustrating a control procedure by the CPU 801 for when a productivity mode switching period is spanned according to an embodiment.

With reference to FIG. 11, a setting screen 1100 displayed on the UI apparatus 600 is described. The setting screen 1100 is a screen (for accepting user input) on which a maintenance person sets a condition for continuation of printing without switching the productivity mode when there is a productivity-up period switch while printing. On the setting screen 1100 are provided radio buttons 1101 and 1102 for selecting to continue the current productivity mode until a predetermined time has elapsed or to continue the current productivity mode until a predetermined number of sheets have been printed, even if there is a productivity-up period switch, respectively.

Also, in the case of continuing the current productivity mode until the predetermined time elapses, it is possible to set the predetermined time, and "10 minutes" is indicated in the example of FIG. 11. Similarly, in the case of continuing the current productivity mode until the predetermined number of sheets are printed, it is possible to set the predetermined number of sheets, and "30 sheets" is indicated in the example of FIG. 11. The configuration is such that only one of these predetermined time and predetermined number of sheets settings can be selected by radio buttons. The setting is confirmed by pressing an OK button 1103 and is stored in the RAM 803 via the UI control unit 820.

Processing Procedure

Next, with reference to FIG. 12, a processing procedure of the CPU 801 during printing according to the present embodiment will be described. The processing described below is realized by the CPU 801 reading a program stored in the ROM 802 into the RAM 803 and executing the program, for example. This flowchart is started in units of pages for which image formation is performed in each job.

In step S1201, the CPU 801 determines whether or not print data remains. If no print data remains, printing is ended, and, if print data remains, the CPU 801 advances to step S1202. In step S1202, the CPU 801 obtains the productivity mode (the high productivity mode or the normal productivity mode) of the current printing job and the current time, and the CPU 801 advances to step S1203. In step S1203, the CPU 801 determines whether the productivity mode of the current printing job and the mode in the productivity-up period of the current time match. If they match, the CPU 801 advances to step S1204, and, if they do not match, the CPU 801 advances to step S1205. In step S1204, the CPU 801 continues printing in the productivity mode determined in the above described step S604 through step S606, and the process returns to step S1201.

Meanwhile, in step S1205, the CPU 801 determines whether or not to maintain the productivity mode for a fixed period even if there is a productivity-up period switch. In a case of maintaining the productivity mode for a fixed period, the CPU 801 advances to step S1206, and, in the case of not maintaining the productivity mode for the fixed period, the CPU 801 advances to step S1208. In step S1206, the CPU 801 determines whether or not the fixed time has elapsed, and, if it has not elapsed, the CPU 801 advances to step S1204 and continues printing, maintaining the current productivity mode. If the fixed time has elapsed, the CPU 801 advances to step S1207, switches the productivity mode, continues the print process, and returns to step S1201.

In step S1208, the CPU 801 maintains the productivity mode until the fixed number of sheets have been printed, even in the case of a productivity-up period switch, and advances to step S1209. In step S1209, the CPU 801 determines whether the fixed number of sheets have been printed. If the fixed number of sheets have been printed, it advances to step S1207, switches the productivity mode, and continues printing. If the fixed number of sheets have not been printed, the CPU 801 advances to step S1210, and, similarly to step S1204, the current productivity mode is continued, and the CPU 801 returns to step S1201.

As described above, in the present embodiment, if processing of an accepted job spans a productivity-up mode switching period, after a fixed time has elapsed from the timing at the spanning, the determined productivity mode is switched in accordance with whether or not the input time or the start time are included in the productivity-up period. Alternatively, in the present embodiment, if processing of an accepted job spans a productivity-up mode switching period, after a fixed number of sheets have been printed from the timing at the spanning, the determined productivity mode is switched in accordance with whether or not the input time or the start time are included in the productivity-up period. In this way, in the present embodiment, even in the case in which there is a productivity-up period switch during printing, it is possible to switch the productivity mode after a fixed period has elapsed or a fixed number of sheets have been printed, rather than switching the productivity mode immediately.

Fifth Embodiment

Below, using FIG. 13, the image forming system according to a fifth embodiment of the present invention will be described. In the present embodiment, a configuration in which the control described in the foregoing first through fourth embodiments is switched in accordance with a user setting, is described. Note that in the present embodiment, a description is given only for configurations and control that differ from the above-described first embodiment.

Setting Screen

Figure 13:
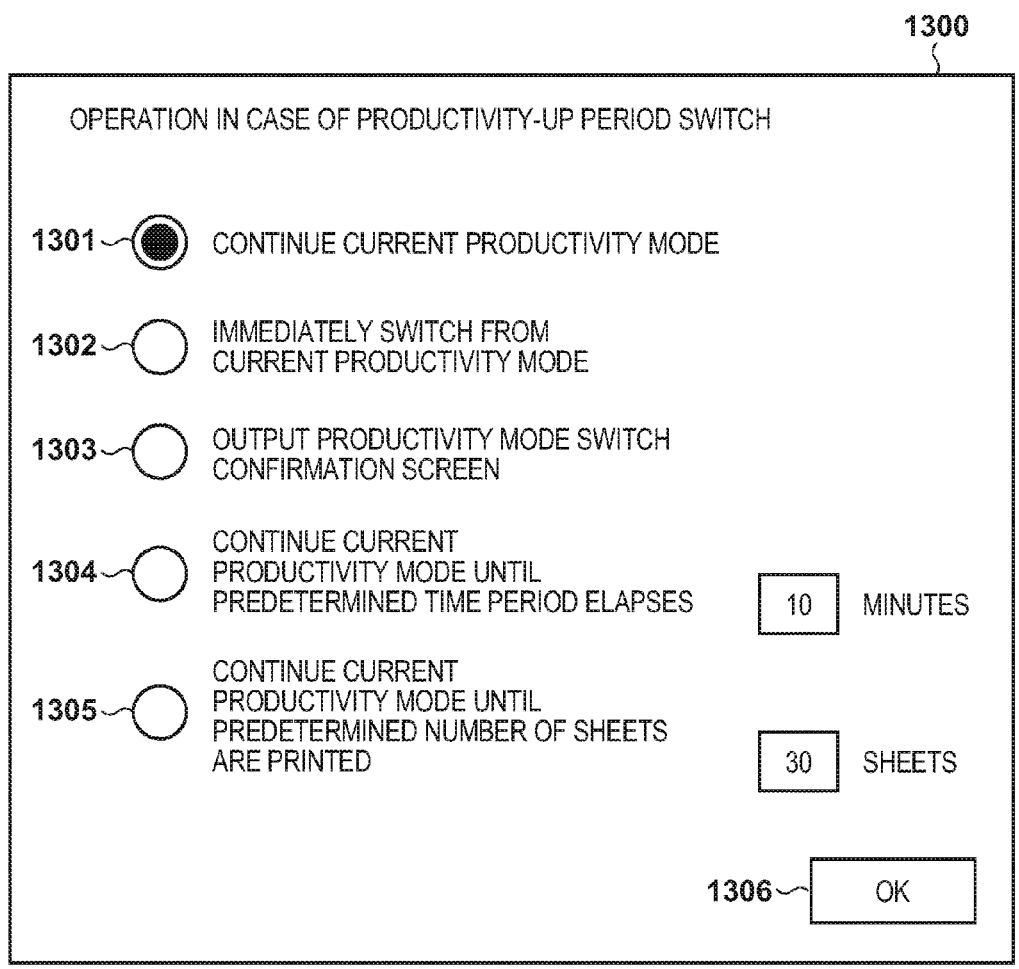
FIG. 13 is a view for describing a screen displayed on the UI apparatus 600 according to an embodiment.

With reference to FIG. 13, a setting screen 1300 displayed on the UI apparatus 600 is described. The setting screen 1300 is a screen on which a maintenance person sets operation control for when there is a productivity-up period switch during printing.

The setting screen 1300 is a screen on which a maintenance person sets the operation control of the foregoing first through fourth embodiments. The is such that only one of "CONTINUE CURRENT PRODUCTIVITY MODE", "IMMEDIATELY SWITCH FROM CURRENT PRODUCTIVITY MODE", "OUTPUT PRODUCTIVITY MODE SWITCH CONFIRMATION SCREEN", "CONTINUE CURRENT PRODUCTIVITY MODE UNTIL PREDE- TERMINED TIME PERIOD ELAPSES", and "CONTINUE CURRENT PRODUCTIVITY MODE UNTIL PREDETERMINED NUMBER OF SHEETS ARE PRINTED" settings can be selected by radio buttons 1301 to 1305, respectively.

The setting is stored in the RAM 803 via the UI control unit 820 after confirming by pressing an OK button 1306. When "CONTINUE CURRENT PRODUCTIVITY MODE" is set, the CPU 801 executes the control described in the first embodiment, described above. When "IMMEDIATELY SWITCH FROM CURRENT PRODUCTIVITY MODE" is set, the CPU 801 executes the control described in the second embodiment, described above. When "OUTPUT PRODUCTIVITY MODE SWITCH CONFIRMATION SCREEN" is set, the CPU 801 executes the third embodiment, described above. When "CONTINUE CURRENT PRODUCTIVITY MODE UNTIL PREDETERMINED TIME PERIOD ELAPSES" or "CONTINUE CURRENT PRODUCTIVITY MODE UNTIL PREDETERMINED NUMBER OF SHEETS ARE PRINTED" is set, the CPU 801 executes the fourth embodiment, described above.

As described above, in the present embodiment, the operation control for when there is a productivity-up period switch during printing can be selected by a maintenance person as appropriate. By this configuration, in an image forming system in which it is possible to set a switch to a high productivity mode, it is possible to provide a method of controlling an image forming apparatus that operates in the high productivity mode only in a period specified by a maintenance person or during a period license according to the needs of a user.

Other Embodiments

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus operable in a first mode, in which a job can be processed at a first printing speed, and a second mode, in which the job can be processed at a second printing speed faster than the first printing speed, the apparatus comprising:
    (A) a memory device that stores a set of instructions; and
    (B) at least one processor that executes the instructions:
        (a) to receive a reservation of a period in which the image forming apparatus will operate in the second mode;
        (b) to control the image forming apparatus to operate in the second mode, rather than the first mode, in accordance with the reservation;
        (c) to set a function in which the image forming apparatus operates in the second mode to be one of disabled and enabled; and
        (d) to enable the reservation to be received based on the set function being changed from disabled to enabled.

2. The image forming apparatus according to claim 1, wherein the at least one processor further executes the instructions:
    (e) to acquire a current time; and
    (f) to control the image forming apparatus to operate in the second mode in accordance with the reservation and the acquired current time.

3. The image forming apparatus according to claim 1, wherein the at least one processor further executes the instructions:
    (e) to receive a plurality of reservations of periods in which the image forming apparatus will operate in the second mode; and
    (f) to control the image forming apparatus to operate in the second mode, rather than the first mode, in accordance with at least one of the plurality of reservations of periods that were received.

4. The image forming apparatus according to claim 1, wherein the at least one processor further executes the instructions (e) to display conditions of the plurality of reservations of periods in a list, wherein respective items indicating each of the plurality of reservations of periods are arranged from the top to the bottom of the list.

5. The image forming apparatus according to claim 4, wherein the respective items indicating each of the plurality of reservations of periods displayed in the list are arranged in increasing order in regards to a start time from the top to the bottom of the list.

6. The image forming apparatus according to claim 1, wherein an interval between sheets printed according to a job when processed in the second mode is shorter than an interval between sheets printed according to the job when processed in the first mode.

7. The image forming apparatus according to claim 1, wherein the at least one processor further executes the instructions (e) to control the image forming apparatus to operate in the second mode under one of (i) a condition that the job is input in the reserved period, and (ii) a condition that the job is started in the reserved period.

8. The image forming apparatus according to claim 1, wherein the at least one processor further executes the instructions (e) to obtain one of (i) an input time and (ii) a start time of the job, and, if the obtained time is included in the reserved period, to control the image forming apparatus to operate in the second mode.

9. An image forming apparatus operable in a first mode, in which a job can be processed at a first printing speed, and a second mode, in which the job can be processed at a second printing speed faster than the first printing speed, the apparatus comprising:
(A) a memory device that stores a set of instructions; and
(B) at least one processor that executes the instructions:
   (a) to receive a reservation of a period, as a reserved period, in which the image forming apparatus will operate in the second mode;
   (b) to control the image forming apparatus to operate in the second mode, rather than the first mode, in accordance with the reservation;
   (c) to control the image forming apparatus to operate, for a job that is processed in a time period that overlaps with the reserved period, in the same mode from the start to the completion of the job;
   (d) to switch the mode in which the job, which is processed in the time period that overlaps with the reserved period, is processed in the middle of processing the job;
   (e) to inquire to a user as to whether to switch the mode in which the job, which is processed in the time period that overlaps with the reserved period, is processed in the middle of processing the job; and
   (f) to determine the mode in which to process the job after the time period, in accordance with a response from the user to the inquiry.

10. An image forming system in which an image forming apparatus, which is operable in a first mode, in which a job can be processed at a first printing speed, and a second mode, in which the job can be processed at a second printing speed faster than the first printing speed, and a server can communicate,
wherein the server comprises:
   (A) a user interface configured to receive a reservation of a period, as a reserved period, in which the image forming apparatus will operate in the second mode; and
   (B) a holding unit configured to hold a reservation received by the user interface as reservation information, and
wherein the image forming apparatus comprises:
   (A) a memory device that stores a set of instructions; and
   (B) at least one processor that executes the instructions:
      (a) to make a request to the server to obtain reservation information from the server;
      (b) to control the image forming apparatus to operate in the second mode, rather than the first mode, in accordance with the obtained reservation information;
      (c) to set a function in which the image forming apparatus operates in the second mode to be one of disabled and enabled; and
      (d) to enable the obtained reservation information to be received based on the function being changed from disabled to enabled.

11. The image forming system according to claim 10, wherein the at least one processor further executes the instructions (e) to control the image forming apparatus to operate in the second mode under one of (i) a condition that the job is input in the reserved period and (ii) a condition that the job is started in the reserved period.

12. The image forming system according to claim 11, wherein the at least one processor further executes the instructions (f) to obtain one of (i) an input time and (ii) a start time of the job, and, if the obtained time is included in the reserved period, to control the image forming apparatus to operate in the second mode.

13. The image forming system according to claim 10, wherein the at least one processor further executes the instructions (e) to control the image forming apparatus to operate, for a job that is processed in a time period that overlaps with the reserved period, in the same mode from the start to the completion of the job.

14. The image forming system according to claim 10, wherein the at least one processor further executes the instructions (e) to switch the mode in which the job, which is processed in the time period that overlaps with the reserved period, is processed in the middle of processing the job.

15. The image forming system according to claim 14, wherein the at least one processor further executes the instructions:
   (f) to inquire to a user as to whether to switch the mode in which the job, which is processed in the time period that overlaps the reserved period, is processed in the middle of processing the job; and
   (g) to determine the mode in which to process the job after the time period, in accordance with a response from the user to the inquiry.

16. A method of controlling an image forming apparatus, which is operable in a first mode, in which a job can be processed at a first printing speed, and a second mode, in which the job can be processed at a second printing speed faster than the first printing speed, the method comprising:
receiving a reservation of a period in which the image forming apparatus will operate in the second mode;
controlling the image forming apparatus to operate in the second mode, rather than the first mode, in accordance with the reservation;
setting a function in which the image forming apparatus operates in the second mode to be one of disabled and enabled; and
enabling the reservation to be received based on the set function being changed from disabled to enabled.

17. A non-transitory computer-readable storage medium storing a program for causing a computer to execute the steps of a method of controlling an image forming apparatus operable in a first mode, in which a job can be processed at a first printing speed, and a second mode, in which the job can be processed at a second printing speed faster than the first printing speed, the method comprising:
receiving a reservation of a period in which the image forming apparatus will operate in the second mode;
controlling the image forming apparatus to operate in the second mode rather than the first mode in accordance with the reservation;
setting a function in which the image forming apparatus operates in the second mode to be one of disabled and enabled; and
enabling the reservation to be received based on the set function being changed from disabled to enabled.

* * * * *